No. 867,805. PATENTED OCT. 8, 1907.
P. E. DAY.
COMBINED RAKE AND BALING PRESS.
APPLICATION FILED APR. 8, 1907.
3 SHEETS—SHEET 1.
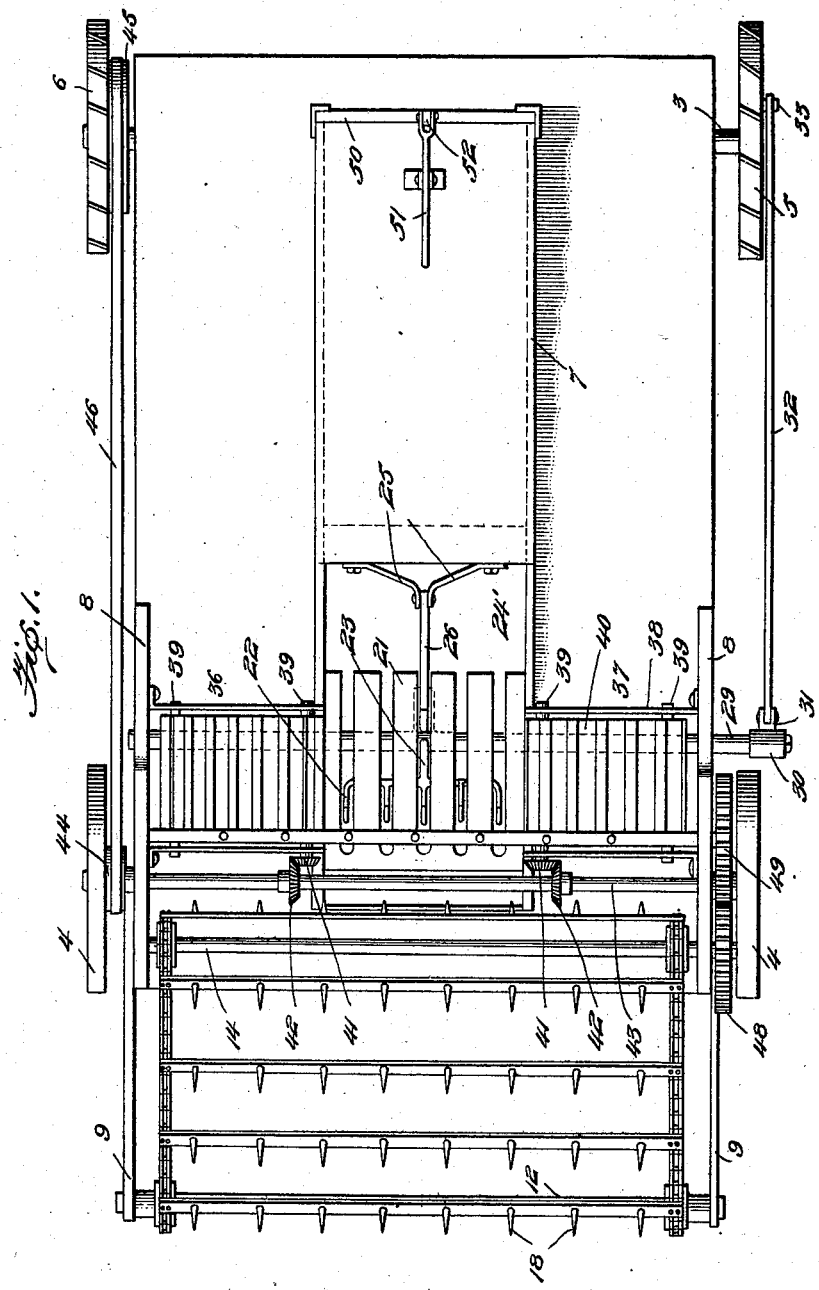
Witnesses
B. Moffatt
Jos. F. Collins
Inventor
Pleasant E. Day
By E. E. Vrooman,
his Attorney.

No. 867,805. PATENTED OCT. 8, 1907.
P. E. DAY.
COMBINED RAKE AND BALING PRESS.
APPLICATION FILED APR. 8, 1907.
3 SHEETS—SHEET 2.
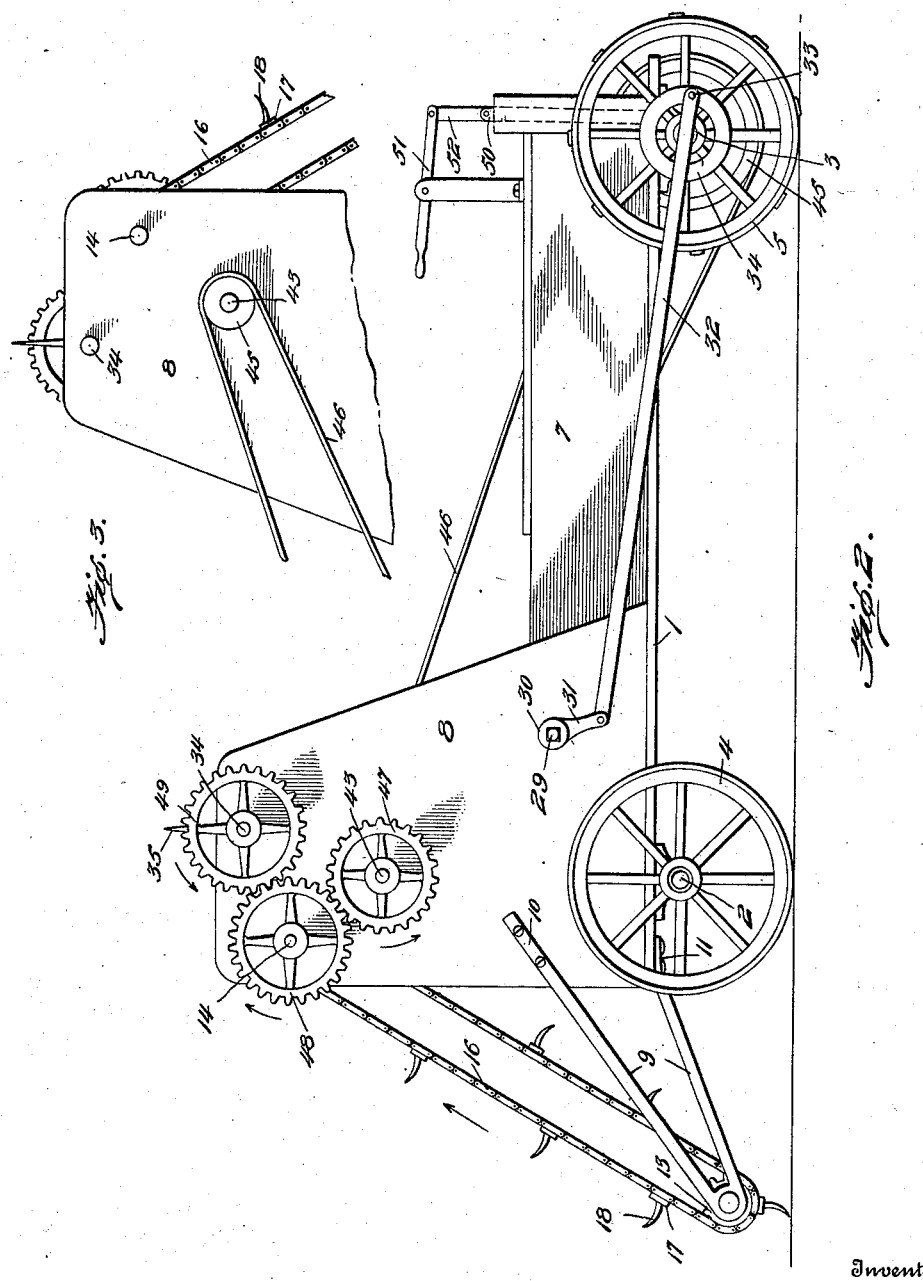
Witnesses
Inventor
Pleasant E. Day
By C. E. Vrooman,
his Attorney.

No. 867,805. PATENTED OCT. 8, 1907.
P. E. DAY.
COMBINED RAKE AND BALING PRESS.
APPLICATION FILED APR. 8, 1907.
3 SHEETS—SHEET 3.
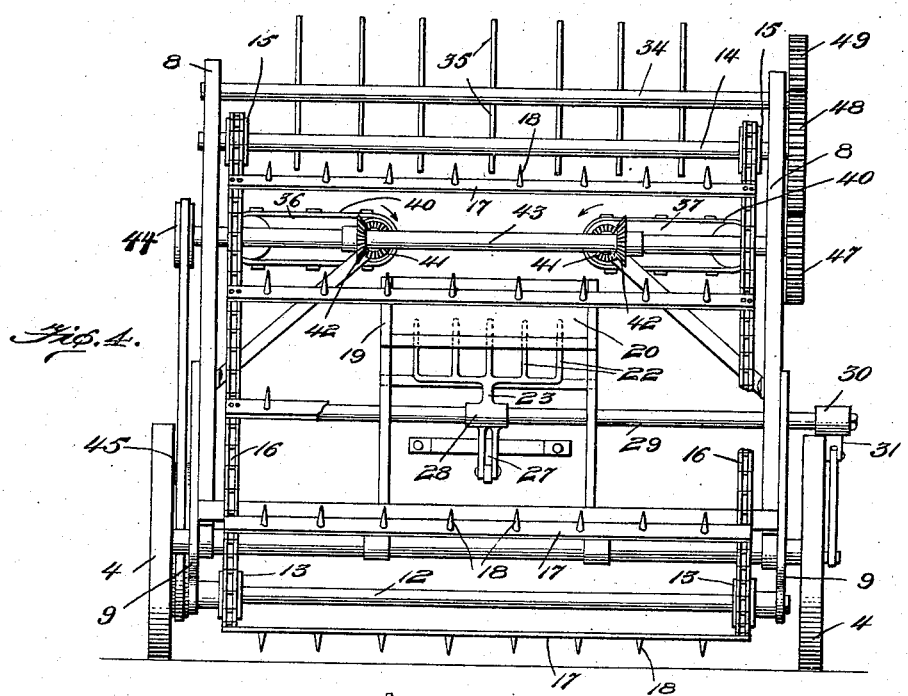
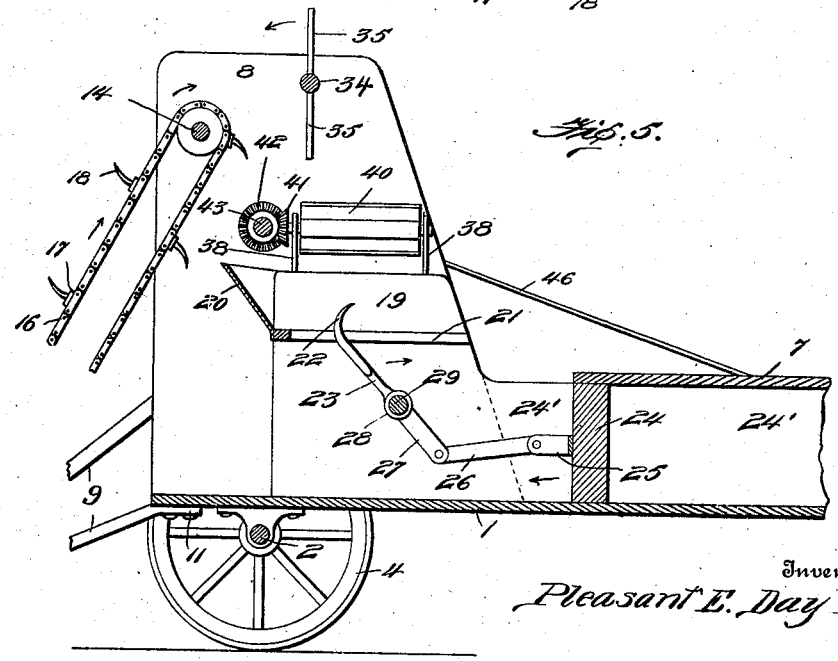
Witnesses
B. M. Offutt
Jos. F. Collins
Inventor
Pleasant E. Day
By E. E. Vrooman,
his Attorney.

UNITED STATES PATENT OFFICE.

PLEASANT E. DAY, OF OAKMAN, ALABAMA.

COMBINED RAKE AND BALING-PRESS.

No. 867,805.　　　　　Specification of Letters Patent.　　　　Patented Oct. 8, 1907.

Application filed April 8, 1907. Serial No. 367,056.

*To all whom it may concern:*

Be it known that I, PLEASANT E. DAY, a citizen of the United States, residing at Oakman, in the county of Walker and State of Alabama, have invented certain new and useful Improvements in a Combined Rake and Baling-Press, of which the following is a specification, reference being had therein to the accompanying drawing.

This invention relates to an improvement in combined rakes and baling presses, and has for its object the provision of means for facilitating the removal of hay, straw, or like material, from off of the ground, and elevating and depositing the same into a baling press.

Another object of the invention is the provision of means for receiving the elevated material, such as hay or straw, and compressing the same into bales.

With these and other objects in view, the invention consists of certain novel constructions, combinations, and arrangements of parts, as will be hereinafter fully described and claimed.

In the drawings: Figure 1 is a top plan view of a mechanism constructed in accordance with my invention. Fig. 2 is a view, in side elevation, of one of the sides of the mechanism depicted in Fig. 1, while Fig. 3 is a fragmentary view of the opposite side of the mechanism. Fig. 4 is a front view of my mechanism or machine. Fig. 5 is a fragmentary vertical, longitudinal, sectional view of the mechanism.

Referring to the drawings, 1 comprises the truck of a vehicle, which is provided with front and rear axles 2 and 3, respectively. Wheels 4 are journaled upon the front axle 2 and wheels 5 and 6 are journaled upon the rear axle 3.

A baling press 7 is carried by a portion of the truck 1, and a pair of uprights 8, 8 are secured to the truck 1 at its forward end. A pair of brackets 9 extend outwardly and downwardly from the truck 1 and uprights 8, 8; each bracket 9 comprises substantially a V-shaped frame, the upper end 10 of which is secured preferably to the side of one of the uprights and the lower end 11 is preferably secured to the bottom of truck 1. By reason of the peculiar structure of these brackets, a very rigid support is provided for revoluble shaft 12. It is to be noted that the end 10 of each bracket is positioned parallel to the side of the upright, whereas the end 11 is positioned horizontally and at substantially right-angles to the plane in which the end 10 is positioned, whereby the brackets are held rigidly. The shaft 12, journaled in the downwardly-extending, substantially V-shaped brackets 9, is provided preferably with a pair of sprocket wheels 13, which wheels 13 are fixedly secured to the shaft between brackets 9. A horizontal shaft 14 is journaled in the uprights 8 near the upper end, and said shaft 14 is provided preferably with a pair of sprocket wheels 15, fixedly secured thereto between uprights 8.

Sprocket chains 16, 16 are mounted upon sprocket wheels 13 and 15, and are adapted to travel over said sprocket wheels when rotary movement is imparted to said wheels through the medium of shafts 12 and 14. A plurality of horizontal slats 17 are fixedly secured near their ends to the sprocket-chains. Each slat is provided with preferably curved teeth 18, which teeth are adapted to pick up or remove off of the ground the hay or straw as the endless carriers or sprocket-chains 16 travel over the lower sprocket-wheels 13.

A hopper 19 is formed upon the truck 1 between the uprights and preferably near the center of the mechanism. This hopper 19 is preferably provided with an inclined outer end 20 and with a slotted bottom 21, see Figs. 1 and 5. The slots of the bottom are closed at the outer ends, whereby the fingers 22 of fork 23 can work freely in the slots of bottom 21 and remove any hay or straw, or the like, falling within the hopper, into the baling chamber 24' of the baling press 7, as the fork 23 is swung forward and the plunger-head 24 is moved rearward. The plunger-head 24 is provided with angle braces 25 on its outside. A link 26 is pivotally mounted at one end between the braces 25 and its outer end is pivotally mounted within the bifurcated lower end 27 of the fork 23, see particularly Fig. 4. The fork 23 is provided intermediate its ends, with a hub 28, and a shaft 29 extends through said hub 28. The hub 28 is fixedly secured, by any suitable means, upon shaft 29, whereby independent rotary movement of fork 23 with respect to shaft 29, is prevented.

It will be obvious that if the shaft 29 is rocked, similar movement will be imparted to fork 23, and, consequently, through the medium of the bifurcated end 27, link 26, and braces 25, a reciprocating movement of the plunger-head 25 will be caused. This rocking movement of the shaft 29 is accomplished by the following means. Secured to one end of shaft 29, which extends beyond one of the uprights 8, see Fig. 1, is a sleeve 30, which sleeve is provided with a bifurcated extension 31. A rod 32 is pivotally secured near one of its ends within the bifurcated end 31, and its opposite end is pivotally secured upon a pin 33 carried by an annular member 34 which is fixedly secured to wheel 5. When the wheel 5 is revolved, the fork 23 will be swung back and forth, causing the fingers to work in the slots of the bottom 21, and the plunger-head 24 will be reciprocated in the baling chamber so as to compress the hay or straw that is deposited into said chamber from the hopper 19. It is to be noted that the upper ends of the fingers are curved inwardly towards the baling chamber, so that the hay will be directed forward towards the open end of the hopper 19, and will permit said fingers to pass under any hay that may have been deposited in the hopper during the forward stroke of the fork. By reason of the fact that the elements 23 and 24 operate synchronously, the hay, or any like material, is received into the baling chamber 24', when the plunger-head 24 is at its farthest outward stroke.

As each slat 17 passes around the sprocket-wheels 15 and begins its downward run, the hay or straw carried thereby will be directed into the hopper 19. To facilitate the removal of the material off of the teeth 18, I provide a revoluble comb, which comprises a revoluble shaft 34 provided with, preferably, straight fingers 35 extending upon opposite sides thereof. When the shaft 24 is revolved, the fingers thereof work between the teeth 18 of the slats, as will be clearly seen by referring to Fig. 4. The revoluble comb removes all of the material carried by the teeth and directs it downward towards the hopper 19. Positioned beneath shaft 34, and between the uprights 8, is a pair of transverse conveyers 36 and 37. Each conveyer is positioned between the hopper 19 and one of the uprights 8. Each conveyer is supported upon a pair of brackets 38 and comprises rollers 39, 39, journaled upon said brackets, and an endless conveyer belt 40 provided with transverse slats, carried by said rollers. Fixedly secured to the inner ends of the inner rollers, are beveled gears 41, which mesh with beveled gears 42, fixedly secured to shaft 43. The shaft 43 is journaled upon the uprights 8, below shaft 14 and shaft 34. Shaft 43 is provided at one end with a pulley or belt-wheel 44, which pulley is fixedly secured to said shaft. The wheel 6 is provided with an annular member 45, and upon the pulley 44 and annular member 45, there is positioned an endless belt 46, whereby, when rotary movement is imparted to wheel 6, similar movement will be imparted to the drive-shaft 43. Secured to the opposite end of drive-shaft 43, from that carrying the pulley 44, is a gear-wheel 47, which meshes with gear-wheel 48. The gear-wheel 48 is fixedly secured to shaft 14 and said wheel 48 meshes with a gear-wheel 49 fixedly secured to shaft 34. When rotary movement is imparted to drive-shaft 43, through the medium of gears 47, 48 and 49, similar movement will be imparted to shafts 14 and 34, thereby causing the endless carriers or chains 16, supporting the slats and fingers to travel over the sprocket-wheels 13 and 15, and at the same time, the rotary comb will be rotated for cleaning the teeth of all of the hay or straw, while the endless conveyers 36 and 37 will be operated for directing any material falling thereon into the hopper 19. The beveled gears 42 face each other upon shaft 43, and thereby cause the upper run of each conveyer to be towards the center of the mechanism, as indicated by the arrows in Fig. 4. The fork 23 and plunger or compressing-head 24 will work in timed relation with the other parts of the mechanism, so that as the hay or straw, or like material, is lifted off of the ground and conveyed or deposited into the hopper 19, the fork 23 will be actuated through the medium of drive-wheel 5, to deposit the material into the compression or baling chamber 24' for forming the bale.

It is to be noted that this combined rake and baling machine is automatic, because it is only necessary to cause the same to travel over the ground in the field and it will automatically pick-up the hay and direct it to the baling-chamber, where it will be compressed, and after the bale has been formed, the same can be removed by lifting the gate 50, by any suitable means, as for instance, lever 51 and link 52.

My improved mechanism may also be operated, without causing the same to pass over the ground, by raising the rear end of the truck and placing the wheels 5 and 6 off of the ground and rotating said wheels by any suitable means. It will be obvious that these wheels may be fixedly secured, by any suitable means, to the rear shaft and, if said rear shaft is rotated, by any suitable driving means, synchronous rotary movement will be imparted to wheels 5 and 6. If the mechanism is not passed over a field, and it is desired to operate the same, the material will have to be brought to the mechanism and placed so as to enable the teeth of the slats to elevate the same and deposit it into the hopper as hereinbefore described. It will, therefore, be noted that my mechanism could be operated in a building for elevating and compressing the hay or straw, or like material.

What I claim is:

1. In a mechanism of the class described, the combination with a support, said support provided with a compression chamber, of a hopper formed upon said support, said hopper provided with a slotted bottom, a fork pivotally mounted upon said support, said fork provided with a finger working in the slot of said hopper, a plunger-head positioned within said compression chamber, means connecting said fork and plunger-head, an endless carrier provided with a tooth, carried by said support, a rotatable comb positioned contiguous to said carrier and adapted to coöperate therewith for removing material off of said tooth and depositing the same into said hopper, and means for synchronously actuating said carrier, comb, fork, and plunger-head.

2. In a mechanism of the class described, the combination with a support, of a hopper provided with a slotted bottom carried by said support, a shaft journaled upon said support, a fork provided with a hub, said hub positioned upon said shaft and fixedly secured thereto, said fork provided with a lower, bifurcated end, said fork provided with curved fingers, said fingers positioned within the slotted bottom of said hopper, said support provided with a compression chamber, a plunger-head working in said chamber, means secured to said plunger-head and positioned in the bifurcated end of said fork for connecting said fork and plunger-head, means for elevating and depositing material in said hopper, and means for actuating said shaft for imparting synchronous movement to said fork and plunger-head.

3. In a mechanism of the class described, the combination with a truck, of parallel uprights carried by said truck, endless elevating means carried by said truck and uprights, a hopper formed upon said truck between said uprights, a pair of transverse conveyers positioned above said hopper and below the upper end of said elevating means, whereby material deposited from said elevating means upon said conveyers will be directed in said hopper, and means for synchronously actuating said elevating means and conveyers.

4. In a mechanism of the class described, the combination with a support, of a hopper carried by said support, conveyers positioned at opposite sides of said hopper and adapted to direct material into the same, endless elevating means carried by said support and positioned contiguous to said conveyers and adapted to deposit material upon said conveyers and into said hopper, and cleaning means for said elevating means, said cleaning means positioned contiguous to and above said conveyers.

5. In a mechanism of the class described, the combination with a support, of an endless rake provided with teeth, carried by said support, a rotatable comb provided with fingers, carried by said support, the fingers of said comb adapted to work between the teeth of said rake, a hopper formed upon said support below said comb and contiguous to said rake, a conveyer positioned beneath said comb and contiguous to said hopper, and means for removing material from said hopper.

6. In a mechanism of the class described, the combination with a truck and uprights, of a hopper formed upon the central portion of said truck, said hopper provided with a slotted bottom, a fork extending through the slotted portion of said bottom and working in said hopper, conveyers positioned at the sides of and adapted to direct material into said hopper, elevating means positioned contiguous to said hopper and conveyers and adapted to direct material upon said conveyers and into said hopper, means for cleaning said elevating means, and means for synchronously actuating said fork, conveyer, cleaning means, and elevating means.

7. In a mechanism of the class described, the combination with a truck and uprights, of a hopper formed upon said truck, a rotatable shaft journaled upon said uprights, a fork fixedly secured to said shaft, a portion of said fork positioned and adapted to rock back and forth in said hopper, a collar secured near one end of said shaft, said collar provided with a bifurcated portion, means positioned within the bifurcated portion of said collar for imparting rotary movement to said shaft, and elevating means supported upon said truck and uprights and adapted to deposit material in said hopper.

8. In a mechanism of the class described, the combination with a truck and uprights, of an endless rake provided with teeth, carried by said truck and uprights, a rotatable comb provided with straight fingers, carried by said uprights, the fingers of said comb working between the teeth of said rake, a hopper formed upon said truck, transverse conveying means positioned under said comb and below the upper end of said rake for receiving material from said rake and depositing the same into said hopper, and means for removing material from said hopper.

9. In a mechanism of the class described, the combination with a truck and uprights, of compression means formed upon said truck, elevating means formed upon said truck and uprights, conveying means positioned contiguous to and adapted to receive material from said elevating means, cleaning means positioned contiguous to said conveying means and adapted to clean said elevating means and deposit material upon said conveying means, and means for receiving material from said conveying means and delivering the same to said compression means.

10. In a mechanism of the class described, the combination with a truck, of a hopper formed upon said truck, said truck provided with a baling chamber, a conveyer positioned contiguous to and having a portion above said hopper, means carried by said truck below said conveyer and adapted to clean said hopper, and endless lifting means carried by said truck and adapted to discharge material above said hopper and upon said conveyer.

11. In a mechanism of the class described, the combination with a truck provided with a baling chamber, a hopper provided with a slot, positioned contiguous to said baling chamber, of a shaft journaled upon said truck, a fork fixedly secured to said shaft and positioned in said slot and extending into said hopper, and means for oscillating said shaft and thereby reciprocating said fork within said slot and hopper.

In testimony whereof I hereunto affix my signature in presence of two witnesses.

PLEASANT E. DAY.

Witnesses:
 MURRAY CANNON,
 J. A. NORRIS.